United States Patent [19]

Keith et al.

[11] 4,288,401
[45] Sep. 8, 1981

[54] THERMOPLASTIC FORMING PROCESS

[75] Inventors: Donald G. Keith, Mount Eliza; Anthony Flecknoe-Brown, Carlton, both of Australia

[73] Assignee: ICI Australia Limited, Victoria, Australia

[21] Appl. No.: 40,312

[22] Filed: May 18, 1979

[30] Foreign Application Priority Data

May 18, 1978 [AU] Australia ............................ PD4433
Jun. 22, 1978 [AU] Australia ............................ PD4833
Apr. 3, 1979 [AU] Australia ............................ PD8263
Apr. 17, 1979 [AU] Australia ............................ PD8398

[51] Int. Cl.³ ............................................. B29C 17/04
[52] U.S. Cl. ..................................... 264/550; 264/554
[58] Field of Search ................ 264/551, 550, 554, 553

[56] References Cited

U.S. PATENT DOCUMENTS

| | | | |
|---|---|---|---|
| 2,974,366 | 3/1961 | Bauman | 18/19 |
| 3,256,564 | 6/1966 | Welshon | 264/551 |
| 3,341,893 | 9/1967 | Edwards | 264/550 |
| 3,578,735 | 5/1971 | Cholmar | 264/551 |
| 3,947,205 | 3/1976 | Edwards | 264/550 |
| 4,075,266 | 2/1978 | Theysohn | 264/255 |
| 4,088,718 | 5/1978 | Mulvany | 264/550 |
| 4,105,736 | 8/1978 | Padovani | 264/550 |
| 4,118,454 | 10/1978 | Miki | 264/550 |
| 4,172,875 | 10/1979 | Beijen | 264/550 |

FOREIGN PATENT DOCUMENTS

| | | |
|---|---|---|
| 220445 | 7/1958 | Australia . |
| 460849 | 5/1974 | Australia . |
| 860810 | 2/1961 | United Kingdom . |
| 1378945 | 1/1975 | United Kingdom . |

*Primary Examiner*—Paul R. Michl
*Attorney, Agent, or Firm*—Cushman, Darby & Cushman

[57] ABSTRACT

Method and apparatus for stretch-forming a hollow article from a sheet of thermoplastic material at a temperature higher than 25° C. below the melting point wherein a stretching tool having at least one tip at a temperature lower than 50° C. below the melting point is pressed against the sheet, and the initially stretched sheet is then further stretched and simultaneously dilated. One form of tool comprises a number of blades arranged around a plunger which are moved forward and outwardly after initially stretching the sheet forwardly. The articles so produced can be further formed by blow moulding.

4 Claims, 19 Drawing Figures

THERMOPLASTIC FORMING PROCESS

This invention relates to a method and apparatus for stretch-forming hollow articles (e.g. cups) from a heat-softened sheet of melt-spinnable plastics material and to stretch-formed plastics hollow articles.

Australian patent specification No. 460 849 (the contents of which are herein incorporated by reference) explains that plastics materials which can be melt-spun into fibres do not stretch-form easily in conventional stretch-forming processes such as drape moulding or vacuum forming because during stretch-forming they thin excessively and often puncture. To overcome this problem, AU Pat. No. 460 849 discloses a method of stretch-forming a heat-softened sheet of melt-spinnable plastics material held against substantial non-stretching movements in which the sheet is stretched initially by a movement of a cold tip of a needle or knife edge relative to the sheet which causes the tip to press against one face of the sheet and stretch or "cuspate" part of the sheet into a cuspidate parison which it is postulated can then be dilated by blowing it into a cavity mould by pneumatic pressure. The cold tip chills and therefore strengthens the localised blob of heat-softened plastics material at the cusp against which the tip presses and so the chilled blob prevents puncture of the sheet by the tip and enables unchilled portions of the sheet to stretch in response to pressure exerted on the blob by the tip. However the method of Australian Pat. No. 460 849 requires the use of cavity moulds and also means for supplying pneumatic pressure if hollow articles such as cups are to be made. Cavity moulds are not only expensive to machine but they also impede rapid cooling of the finished article.

British patent specification No. 1,378,945 (the contents of which are herein incorporated by reference) discloses an alternative method of stretch-forming a heat-softened sheet of a polyolefin. (Most polyolefins are melt-spinnable plastics materials). The sheet is held against substantial non-stretching movement and is stretched initially by a movement of a stretching tool relative to the sheet which causes the leading end of the tool to press against one face of the sheet and to stretch part of the sheet into a parison which is then dilated by blowing into a cavity mould by pneumatic pressure to form a cup. GB Pat. No. 1,378,945 explains that during stretching, excessive thinning of the sheet is caused by frictional forces and premature cooling occurring in regions of the sheet which contact the stretching tool and GB Pat. No. 1,378,945 seeks to minimise this problem by use of a special stretching tool. The special stretching tool comprises a leading end and a body formed with integral longitudinally extending tips of lobial cross-section spaced apart by longitudinally extending recesses. Therefore the only portions of the tool to contact the sheet during stretching are its leading end and its lobial tips. This leaves large portions of the sheet free from contact with the tool and free to stretch unhindered by frictional forces and premature cooling. However, the tips are integral with the body of the tool and cannot be separated from one another and so after an initial stretching by the tool, GB Pat. No. 1,378,945 must rely on a blowing process for dilation and hence a cavity mould and means for supplying pneumatic pressure are needed. Also, despite the use of lobial tips, large areas of the sheet still contact the stretching tool.

Australian patent specification No. 220 445 discloses a method and apparatus for producing a hollow open-topped container by pressing an expansible plunger against a confined molten sheet of polythene, to the desired depth of draw, then expanding the plunger laterally, allowing the polythene to set, and finally collapsing and retracting the plunger. As an additional step, the polythene may be blown pneumatically against the wall of a female mould while still hot after shaping by the plunger. It is found that this method does not produce containers of sufficiently uniform wall thickness to enable the potential saving of material to be realised.

It has now been discovered that when the sheet is stretched initially by a primary movement of a cold stretching tool followed by simultaneous stretching and dilation, greater uniformity of wall thickness is achieved.

Accordingly this invention provides a method of stretch-forming a hollow article (e.g. a cup) from a sheet of thermoplastic material at a temperature higher than 25° C. below the melting point and held against substantial non-stretching movement wherein the sheet is stretched initially by primary movement relative to the sheet of a stretching tool which movement presses the tool against one face of the sheet; characterised in that the tool comprises at least one tip which presses against the sheet during stretching and is at a temperature lower than 50° C. below the melting point of the sheet and in that the initially stretched sheet is simultaneously with the continued primary movement of the stretching tool dilated in a direction transverse to the direction of the primary movement of the stretching tool. The stretching of the sheet into a cuspidate parison by an initial movement of a stretching tool is called "cuspation" by AU Pat. No. 460 849.

Accordingly the invention also provides apparatus for stretch-forming a heat-softened sheet of thermoplastic material, the apparatus comprising means to hold the sheet against substantial non-stretching movement, a stretching tool, and means to cause a primary movement of the stretching tool relative to the sheet so as to cause the tool to press against the sheet and to stretch the sheet characterised in that the stretching tool comprises at least one tip for pressing against the sheet to cause it to stretch and means to dilate the sheet simultaneously with the continued primary movement of the stretching tool in a direction transverse to the direction of the primary movement of the tool.

In one embodiment, the stretching tool comprises an array of at least six neighbouring separable tips which simultaneously engage the sheet.

In another embodiment, the stretching tool comprises a hollow needle which deforms the sheet into a female mould and dilates the sheet against the mould wall by pressure fluid delivered through the needle.

As the tool touches the sheet, at each point of contact it chills a blob of the hot plastics material so strengthening the blob and enabling it to resist puncture by the tool even if the tool is needle sharp.

The strengthened chilled blobs also enable the sheet to stretch in response to pressure exerted on the blobs by the tool. The use of a sharp tool prodces very small blobs (e.g. 0.5 to 2 mm wide) leaving nearly all the stretchable sheet free to stretch out of contact with the stretching tool and this promotes a more controlled thinning of the sheet. The chilled blobs themselves suffer less stretching and therefore less thinning than other portions of the sheet so that the perimeter of the base of the hollow article is marked by blobs of less stretched plastics material. Accordingly this invention also provides a stretch-formed hollow plastics container comprising a base and side wall characterised in that the perimeter of the base is marked by blobs of less stretched plastics material. Usually the blobs are virtually unstretched and unthinned.

In order to ensure adequate stengthening of the blobs, it is necessary to ensure that an adequate temperature differential exists between the tool and the heat-softened sheet. In the case of most commonly available plastics materials this can be achieved by using cold (e.g. room temperature) tips. The size of the minimum temperature differential will depend on the nature of the plastics material, the thickness of the sheet, the shape and size of the tips, the specific heat and termal conductivity of the material from which the tips are made and the speed at which the sheet is stetched by the primary movement of the stretching tool. Useful temperatures for various plastics materials are given by AU Pat. No. 460 849. Preferably the sheet should be from 0.015 to 4 (especially 0.5 to 2.0) mm thick.

Examples of suitable thermoplastic material are:
(a) high impact polystyrenes;
(b) aliphatic (preferably crystalline) polyolefins including poly-4-methyl pentene-1, polybutenes, low, medium, and high density polyethylenes or copolymers of ethylene with vinyl alcohol, vinyl acetate, acrylic or methacrylic acids or their methyl, propyl, ethyl or butyl esters or homopolymers of propylene or copolymers of propylene with up to 30% (by weight of the copolymer) of ethylene and preferably the ethylene and propylene polymers should have a melt flow index of between 0.1 to 8 g/10 minutes as measured according to British Standard 2782 Part 1/105C of 1970 except that in the case of polymers containing a major amount by weight of propylene, a temperature of 230° C. is used instead of 190° C.;
(c) thermoplastic rubbers including ethylene propylene rubbers such as those described in an article by L. M. Glanville in "Chemistry and Industry" Mar. 16, 1974 pages 255 to 257 (the contents of which are herein incorporated by reference) especially when diene modified using dienes such as 1,4-hexadiene, dicyclopentadiene or methylene or ethylidiene norbornenes and in particular blends of such rubbers with polypropylenes;
(d) polyesters such as the condensates of ethylene glycol or tetramethylene glycol or 1,1-(dihydroxymethyl) cyclohexane with terephthalic acid or mixtures of terephthalic acid and isophthalic acid;
(e) polyamides including nylons 66, 610, 6 and 11
(f) copolymers of vinylidene chloride;
(g) inorganic glasses including soda or borosilicate glass; and
(h) supercooled liquid sugar solution such as toffee.

During initial stretching of the sheet by a multiple tip tool, saddles of heat-softened material form between neighbouring tips. The material inboard of these saddles is virtually unextended during initial stretching whereas material outboard of the saddles (which forms the side walls of the hollow article) stretches in proportion to the extent of the initial movement of the stretching tool. Separation of the tips stretches material inboard of the saddles to dilate the initially stretched sheet and form the base of the hollow article.

At the cost of increasing the area of contact between the sheet and the stretching tool, a more positive control on the shape of the article (especially the side walls) can be achieved by using tips each of which is located to one end of an edge and during dilation the edges are brought into contact with the sheet. In this way the edges can be used to define for example a slanting or vertical side wall comprising three or more contiguous longitudinal flat or slightly concave panels wherein the boundary between each pair of contiguous panels extends from a blob of less stretched material located on the perimeter of the base of the hollow article. The boundary is often a slight ridge and if unpigmented plastics material is used it can show improved translucency. Provided the edges comprise sharp knife edges, the increase in area of contact between the sheet and stretching tool has little effect on the freedom of the sheet to stretch.

Separation of the knife edges also stretches the material of the side walls transversely to the stretch imparted by the initial stretching of the sheet. Accordingly when the sheet comprises a crystalline plastics material at a temperature below (preferably 15° C. or less below) its crystalline melting point, the initial stretching imparts a longitudinal orientation to the material of the side wall and the separation of the tips and edges imparts a transverse orientation to the material of the base and side wall with the result that the side wall becomes biaxially orientated and hence its hoop strength is improved.

When making cups it is preferred that each tip when fully separated be spaced 2 to 20 (especially 6 to 12) mm from its adjacent neighbours.

In contrast to earlier proposals, with the present invention the temperature of the sheet is not critical, provided it is hotter than a temperature 25° C. below the melting point of the thermoplastic. The upper limit is determined only by decomposition or combustion of the thermoplastic.

Practical examples of the method and apparatus according to the present invention will now be described with reference to the accompanying drawings.

Figure 1:
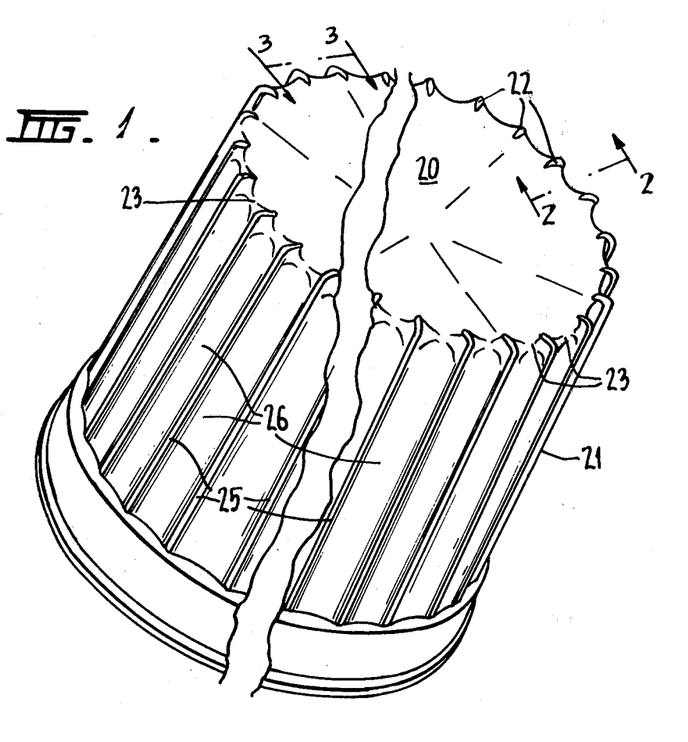
FIG. 1 is a perspective view of a stretch-formed cup.
Figure 2:
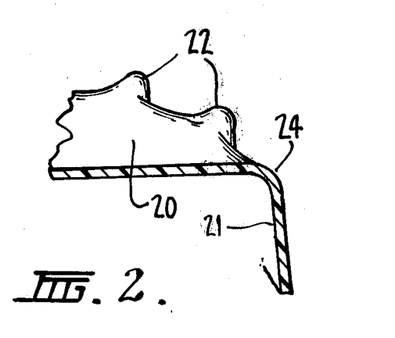
FIG. 2 is a partial section on a larger scale on the line 2—2 of FIG. 1.
Figure 3:
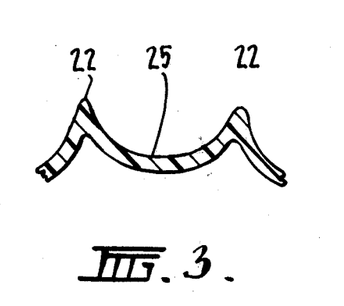
FIG. 3 is a partial section on a larger scale on the line 3—3 of FIG. 1.

Referring now to the drawings, FIG. 1 shows a cup 105 mm in diameter at the open end and 65 mm deep, which has been stretch-formed from a sheet of crystalline polypropylene 0.8 mm in thickness. The cup is generally frusto-concial in shape, having a substantially circular base 20 and an outwardly sloping side wall 21. Thirty-six short thin blobs 22 of virtually unstretched polypropylene are spaced uniformly around the perimeter of the base 20. These blobs 22, which are exaggerated in the drawings for greater clarity, are 1 mm wide, extend 5 mm radially inwards from the perimeter, and stand 0.5 mm proud of the adjacent surface of the base 20. The blobs 22 are spaced apart by doubly radiussed scallops 23 consisting of orthogonally radiussed curves 24 and 25 shown in FIGS. 2 and 3.

Each blob 22 is integral with a band 25 of polypropylene thicker than the adjacent wall portions 26, which band is coplanar with the longitudinal axis of the cup. The bands, like the blobs 22, are composed of virtually unstretched plastic. The wall portions 26 are slightly concave, and merge into the scallops 23.

Figures 4, 5, 6:
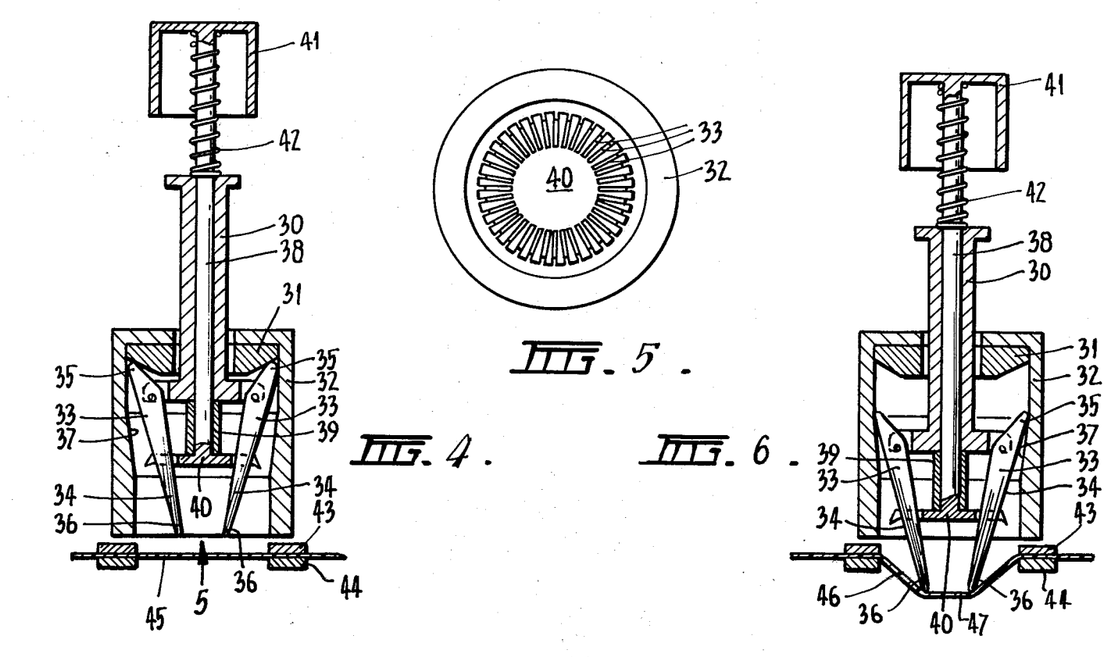
FIG. 4 is a sectional elevation of apparatus for making the cup shown in FIG. 1.
FIG. 5 is an underneath plan in the direction of the arrow 5 in FIG. 1.
FIGS. 6 to 9 are views similar to FIG. 4 showing successive stages in the formation of the cup.

The apparatus shown in FIG. 4 comprises a primary plunger 30 sliding in a central bearing 31 formed in one end of a cylindrical housing 32, which is open at the other end. Within the housing, the plunger 30 supports thirty-six flat blades 33 pivoted to the plunger at uniform intervals around the axis, each blade being coplanar with the axis. The outer edge 34 of each blade is straight, and terminates at the end nearest to the closed end of the housing 32 in a heel 35 and at the other end in a tip 36. The heels 35 rest against the internal surface of the housing 32, which surface slopes inwardly over its length as shown at 37.

A secondary plunger 38 slides longitudinally within the plunger 30 to extend therefrom at both ends. Fixed to the end of the plunger 38 projecting from the plunger 30 within the housing 32 is a sleeve 39 which serves as a stop preventing withdrawal of the plunger 38 and a terminal flat circular plate 40 which has radial slots around its periphery to receive the blades 33. At the other end, the plunger 38 has a knob 41 fixed to it, with a compression spring 42 retained between the inside of the knob 41 and the adjacent end of the plunger 30.

Beyond the open end of the housing 32 and centred on the same axis are two clamping rings 43 and 44 having the same internal diameter as the open end of the housing 32.

In operation, a heat softened sheet 45 of polypropylene 0.8 mm thick was clamped between the rings 43 and 44. By pressing on the knob 41, the plunger 38, and through the spring 42, the plunger 30, were advanced along the housing 32 until the tips 36 engaged the sheet 45, deflecting it as shown in FIG. 6. During this movement, the heels 35 of the blades 33 slid along the internal surface of the housing 32.

Figure 7:
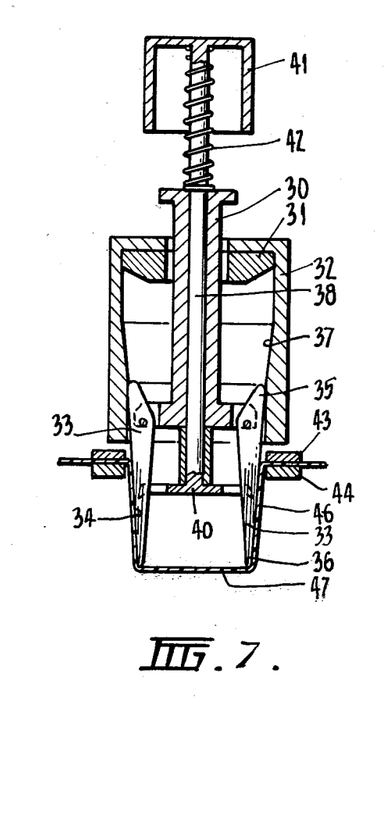

As the plunger continued to advance, the heels 35 were pressed inwardly by the sloping portion 37 of the internal surface of the housing 32. As a result, the blades 33 rotated about their pivots, moving the tips 36 outwardly away from one another, as shown in FIG. 7. During this movement, the portions 46 of the sheet were stretched, mainly longitudinally but also slightly stretched laterally, and the portion 47 inside the array of tips 36 was stretched uniformly in all directions, i.e. biaxially oriented.

Figure 8:
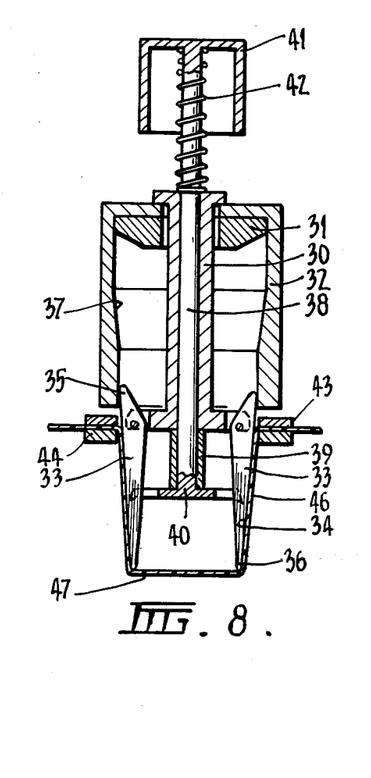

As the plungers continued to advance, the portions 46 of the sheet were still further stretched, until the rear end of the plunger 30 abutted against the housing 32, as shown in FIG. 8.

Figure 9:
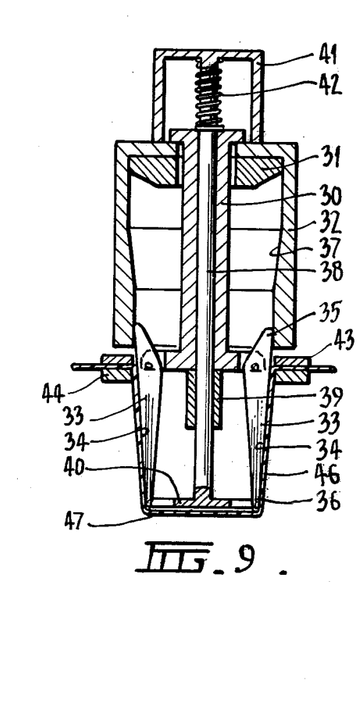

On further pressure on the knob 41, the spring 42 compressed, until the knob engaged the housing 32, at which time the plate 40 contacted the under side of the sheet portion 47, retaining it firmly in position, as shown in FIG. 9.

When the sheet had cooled, the plunger 38 was retracted until the sleeve 39 contacted the plunger 30, whereupon the plungers 38 and 40 were retracted together to the position shown in FIG. 4. The rings 43 and 44 were then released from the sheet, and removed laterally from the apparatus, allowing the finished product, which was a cup as shown in FIG. 1, to fall from the apparatus.

Figure 10:
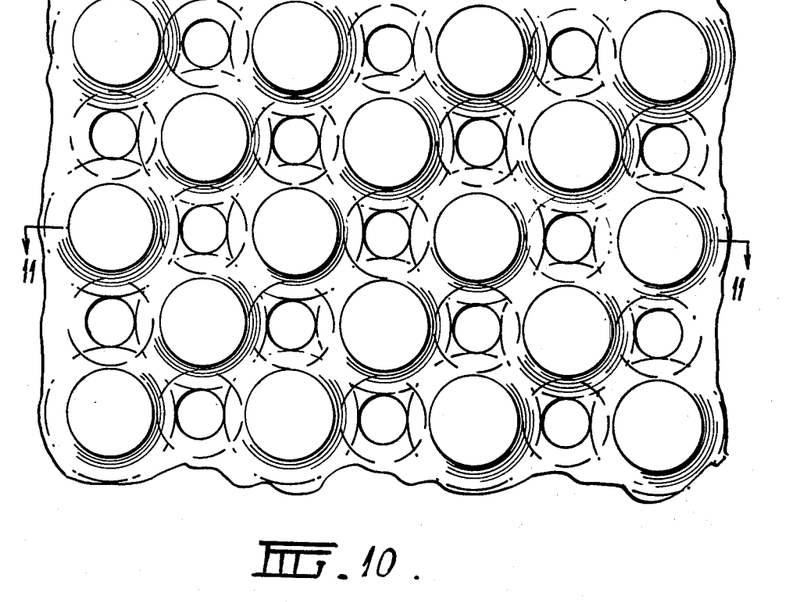
FIG. 10 is a plan view of an arrangement whereby a number of interpenetrating tools cooperate to simultaneously produce a multiplicity of cups.
Figure 11:
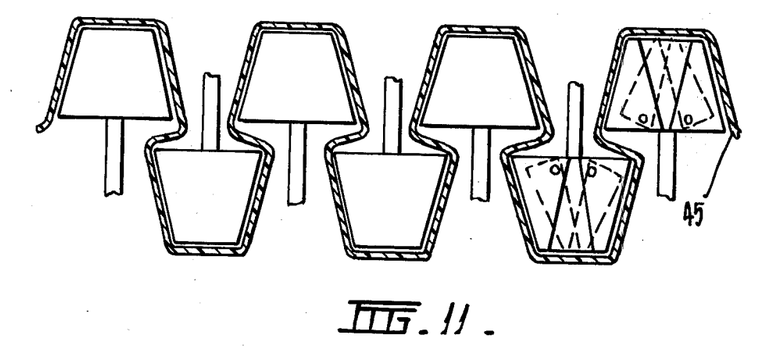
FIG. 11 is a cross-section through FIG. 10 in the direction of arrows 11—11.

As shown in FIGS. 10 and 11, it is possible to arrange a number of tools of the construction shown in FIG. 4 on opposite sides of the sheet 45 in such a way that the tools interpenetrate as they advance in unison.

Figure 12:
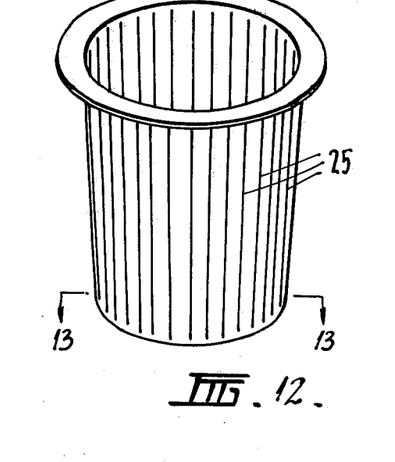
FIG. 12 is a perspective view of a modified cup.
Figure 13:
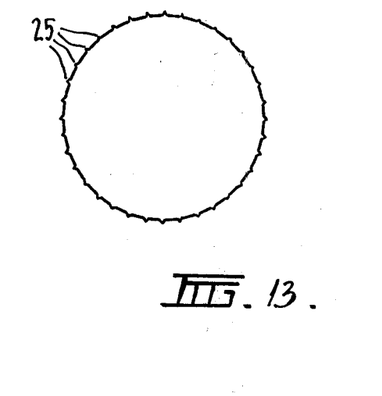
FIG. 13 is an underneath plan view of the cup shown in FIG. 12, in the direction of the arrow 13.

The cups formed by the apparatus shown in FIG. 4 may be further dilated by blowing while still hot enough to be deformed into a female mould slightly larger than the cup. As shown in FIGS. 12 and 13, the cups as so produced have smoother walls than the cup shown in FIG. 1, the bands 25 being less pronounced. The crush-strength of the cups is consequently lower than the cup of FIG. 1.

Figure 14:
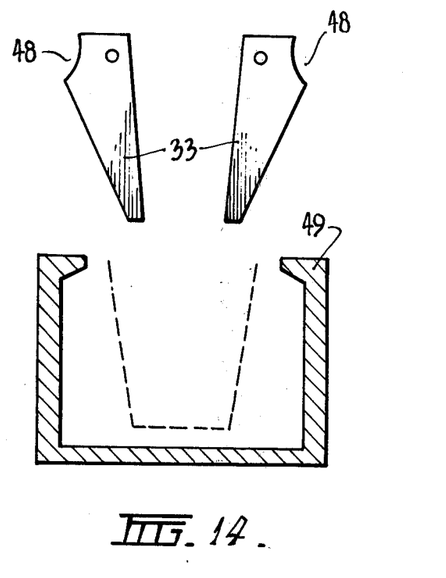
FIG. 14 is a sectional elevation of portion of a modified apparatus.
Figure 15:
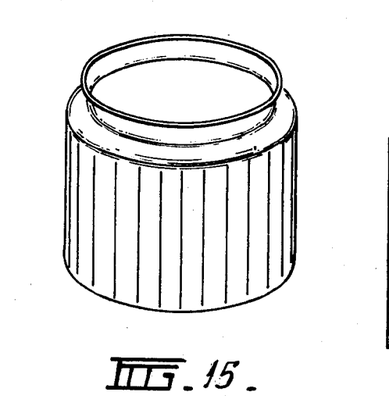
FIG. 15 is a jar produced by the apparatus of FIG. 14.
Figure 16:
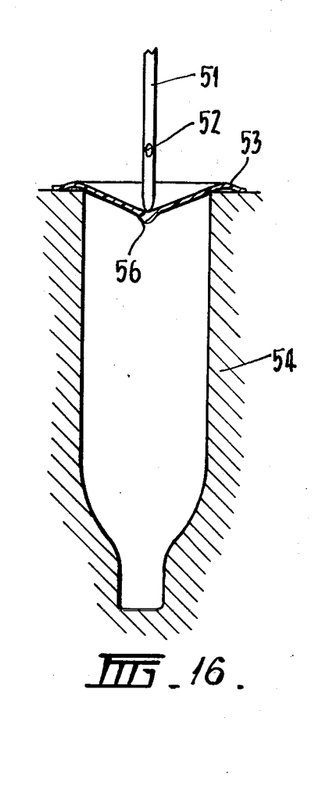
FIG. 16 is a sectional elevation of a different form of apparatus.

By forming external notches 48 in the blades 33, as shown in FIG. 14, it is possible to form a cup inside a female mould 49 of such shape that, on dilating the cup with compressed air, a necked jar 50 as shown in FIG. 15 is obtained.

A suitable polypropylene for making cups illustrated in the drawings has a melt flow index of 1.5 g/10 minutes and is a sequential copolymer of propylene with 13% (by weight of the copolymer) of ethylene made by injecting ethylene into the closing stages of an otherwise homopolymerisation of propylene. The sheet polypropylene is heated to a temperature of 160° C. and the tips and knife-edges of the stretching tools are heated to 100° C.

For use in the method and apparatus of this invention, the invention also provides a stretching tool comprising outwardly separable tips.

The thickened ribs or bands 25 are deliberately formed to perform two functions, first to control the stretching during hot-forming, second to stiffen the cup. It can be shown that the structure of the wall, namely relatively thick ribs connected by thinner webs, curved or flat, gives superior stiffness to weight properties over conventional, uniform thickness container walls.

For example, a plain polystyrene cup weighing 14.95 g having a wall thickness varying between 0.5 mm and 0.3 mm was tested and found to have a crush load of 37 kg. A ribbed cup according to the present invention, weighing 14.75 g but otherwise identical had a crush load of 42 kg, i.e. 13% greater.

It was found that a polystyrene tub having a wall thickness of 0.2 mm and a rib thickness of 0.75 mm has the same stiffness as a tub of the same overall dimensions but 30% heavier. Considerable savings of material are therefore possible with the process and apparatus of this invention.

Relatively independent control of the forming of the webs and the chilled reinforcing ribs can be achieved by using enough knife blades so that the combined effect of the increased viscosity of the chilled material can draw out material from the parts of the material not in contact with the blades. The portion of the blades in contact with the material define the position and length of the reinforcing ribs. The path of the blades can be designed so as to give a predetermined length of contact between blades and material. This in conjunction with the time of contact and the area of chilling at the blade/material interface control the thickness of the rib. In general it is preferred to produce the thickest possible rib, and the rib to web wall thickness ratio should preferably exceed 1.5 for significant stiffening to occur.

The containers produced by the apparatus of FIG. 4 have walls which are biaxially oriented and hence have improved hoop strength. Where it is intended to further biaxially orient the containers by inflation as shown in FIGS. 14 and 15, the ribs serve as a reservoir of amorphous material permitting elongation in both width and length yet serving to deliver the material in a controlled way.

Figure 17:
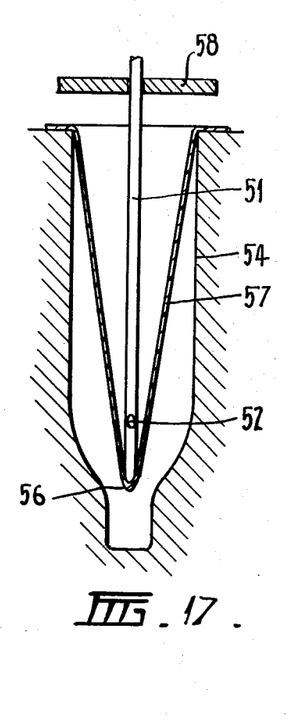
FIGS. 17 and 18 are views similar to FIG. 16 at successive stages in the formation of a moulding.
Figure 18:
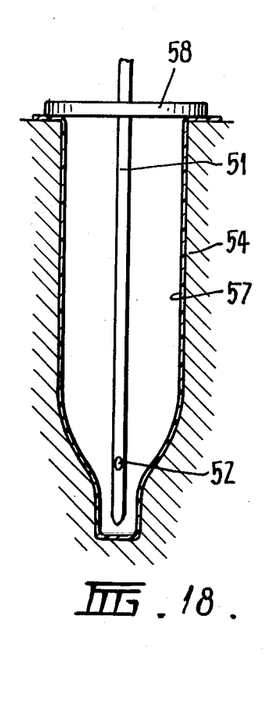

An alternative method of manufacturing hollow articles is shown in FIGS. 16 to 19. A hollow needle 51 having along its side an aperature 52 is pressed against a heat-softened sheet 53 of thermoplastic stretched across the open top of a bottle-shaped female mould 54. The needle is maintained at a temperature 50° C. below the crystalline melting point of the thermoplastic, and, where it contacts the sheet, a small blob 56 of thermoplastic is formed. As the needle 51 penetrates into the mould, the blob 56 is pushed along in front of the needle thereby stretching the thermoplastic to form the walls 57 of a cusp, as shown in FIG. 17. A plate 58 is slidably attached around the needle 51 at such a location that when the blob 56 approaches the bottom of the mould, the plate 58 seals the open end of the mould across the sheet 53. Compressed air is then blown through the needle as it advances further through the plate 58, and emerges through the aperture 52 to stretch the walls 57 into contact with the entire internal surface of the mould. On cooling, the resultant moulding can be removed. As shown in FIG. 18, this moulding is a bottomless bottle, the walls of which are biaxially oriented.

Figure 19:
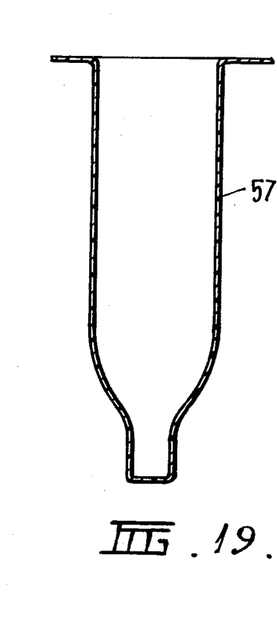
FIG. 19 is a section of the moulding produced by the apparatus shown in FIGS. 16 to 18.

The bottle of FIG. 19 can be conveniently filled through the open bottom, which is then sealed to provide a product ready for sale.

We claim:

1. A method of stretch-forming a hollow article from a sheet of thermoplastic material at a temperature higher than 25° C. below the melting point and held against substantial non-stretching movement comprising pressing against one face of the sheet in a primary movement a plurality of tips carried symmetrically by a tool at a temperature lower than 50° C. below the melting point of the sheet and comprising a plunger having an axis extending in the direction of the primary movement, each tip being constituted by an end of a blade which blade is coplanar with the plunger axis and pivoted to the plunger, then while continuing the primary movement rotating the blades about the pivots while maintaining the blades coplanar with the plunger axis to symmetrically separate the tips in directions transverse of the plunger and to bring the outer edge of each blade from the tip progressively towards the rear into engagement with the sheet.

2. A method according to claim 1, wherein the blades are pivoted intermediate their length, and are rotated by the action of a cam upon each blade at the end remote from the tip.

3. A method of stretch-forming a hollow article from a sheet of heated thermoplastic material comprising: arranging a plurality of elongated blades around a given axis and coplanar with the axis, each blade having a tip at one end and an outer edge facing away from said given axis; moving the blades parallel to said given axis so that the tips of the blades press against and begin to stretch the sheet of thermoplastic material; and while continuing such axial movement rotating each blade about an axis transverse to said given axis in a manner to swing the tips of the blades away from said given axis and to bring the outer edges of the blades into engagement with the adjacent stretched portion of the sheet.

4. A method as in claim 3 wherein the blades are initially inclined relative to said given axis such that the tip ends of the blades are closer to said given axis than are the opposite ends of said blades.

* * * * *